(12) United States Patent
Seibt

(10) Patent No.: US 11,299,272 B2
(45) Date of Patent: Apr. 12, 2022

(54) CABIN MODULE HAVING A SANITARY UNIT

(71) Applicant: Airbus Operations GmbH, Hamburg (DE)

(72) Inventor: Christian Seibt, Hamburg (DE)

(73) Assignee: Airbus Operations GmbH

( * ) Notice: Subject to any disclaimer, the term of this patent is extended or adjusted under 35 U.S.C. 154(b) by 424 days.

(21) Appl. No.: 16/268,895

(22) Filed: Feb. 6, 2019

(65) Prior Publication Data

US 2019/0248495 A1 Aug. 15, 2019

(30) Foreign Application Priority Data

Feb. 12, 2018 (DE) .................... 10 2018 103 099.1

(51) Int. Cl.
*B64D 11/02* (2006.01)
(52) U.S. Cl.
CPC ................... *B64D 11/02* (2013.01)
(58) Field of Classification Search
CPC combination set(s) only.
See application file for complete search history.

(56) References Cited

U.S. PATENT DOCUMENTS

| | | | |
|---|---|---|---|
| 6,615,421 B2 | 9/2003 | Itakura | |
| 8,534,602 B2 * | 9/2013 | Jakubec | B64D 11/00 244/118.5 |
| 10,909,397 B2 * | 2/2021 | Behr | G06K 9/00791 |
| 2003/0066931 A1 | 4/2003 | Ward | |
| 2004/0003461 A1 | 1/2004 | Leclercq et al. | |
| 2006/0169840 A1 | 8/2006 | French et al. | |
| 2010/0059625 A1 | 3/2010 | Saint-Jalmes et al. | |
| 2012/0048998 A1 * | 3/2012 | Schliwa | B64D 11/02 244/118.6 |
| 2012/0261509 A1 * | 10/2012 | Grant | B64D 11/02 244/118.5 |
| 2013/0160061 A1 * | 6/2013 | Koch | G08B 13/196 725/76 |

(Continued)

FOREIGN PATENT DOCUMENTS

| | | |
|---|---|---|
| DE | 10 2007 035 681 A1 | 2/2009 |
| DE | 10 2014 102 378 A1 | 8/2015 |

(Continued)

*Primary Examiner* — Joshua J Michener
*Assistant Examiner* — Cindi M Curry
(74) *Attorney, Agent, or Firm* — Lerner, David, Littenberg, Krumholz & Mentlik, LLP

(57) ABSTRACT

In order to make available a space-saving sanitary unit having a toilet which offers improved user convenience to persons with restricted mobility, a cabin module for an aircraft is described which has a sanitary unit. The sanitary unit has a toilet cubicle with a toilet. The toilet cubicle is formed by four side walls and the toilet is arranged on a first side wall. A first access door is arranged in a second side wall, which extends transversely to the first side wall and adjoins the first side wall. A surface which is designed to at least partially accommodate a wheelchair is provided as an option within the toilet cubicle. The cabin module is configured to be installed with the second side wall transversely to a direction of flight. The first side wall 18a is aligned with an external wall in the installed state.

13 Claims, 7 Drawing Sheets

(56) References Cited

U.S. PATENT DOCUMENTS

| | | | |
|---|---|---|---|
| 2014/0117156 A1* | 5/2014 | Boren | B64D 11/02 244/118.6 |
| 2014/0291446 A1* | 10/2014 | Reams | B64D 11/02 244/118.5 |
| 2015/0096118 A1 | 4/2015 | McIntosh | |
| 2016/0332718 A1 | 11/2016 | Guering | |
| 2016/0355266 A1* | 12/2016 | Seibt | B64D 11/02 |
| 2017/0043857 A1 | 2/2017 | Seibt | |
| 2017/0253315 A1 | 9/2017 | Lange et al. | |
| 2018/0065751 A1* | 3/2018 | Demetrio Correa et al. | B64D 11/02 |
| 2018/0297707 A1* | 10/2018 | Gharia | B64D 11/0023 |
| 2018/0334237 A1* | 11/2018 | King | B64C 1/1469 |
| 2018/0346090 A1* | 12/2018 | Heidtmann | B64D 11/02 |

FOREIGN PATENT DOCUMENTS

| | | |
|---|---|---|
| DE | 10 2014 104 921 A1 | 10/2015 |
| DE | 10 2016 103 825 A1 | 9/2017 |
| WO | 2014/154758 A1 | 10/2014 |

\* cited by examiner

CABIN MODULE HAVING A SANITARY UNIT

FIELD OF THE INVENTION

The present invention relates to a cabin module for an aircraft, to an aircraft, to a method for creating a cabin module for an aircraft and to a use of a cabin module in an aircraft.

BACKGROUND OF THE INVENTION

To meet the sanitary needs of passengers, sanitary units with toilets, for example, are provided on board aircraft. In order to use the space on board as efficiently as possible, sanitary areas are made as compact and therefore space-saving as possible, for example. In the use of toilets by passengers, e.g. passengers with restricted mobility who use a wheelchair, space reduction can imply restrictions on use, and additional measures can be provided in this regard. WO 2014/154758 A1 shows a toilet cubicle with a transfer seat to assist in the transfer from a wheelchair to a toilet seat. It has been found that the importance of the usage of toilets by passengers with restricted mobility is increasing. Moreover, there is a continued need for further optimization in respect of the cabin space available for passenger seats.

BRIEF SUMMARY OF THE INVENTION

Aspects of the present invention may make available a space-saving sanitary unit with a toilet which offers improved user convenience for persons with restricted mobility.

It should be noted that the following aspects described in respect of the cabin module also apply to the aircraft, to the method and to the use.

According to an embodiment of the invention, a cabin module for an aircraft is provided. The cabin module has a sanitary unit, which is constructed with a toilet cubicle having a toilet. The toilet cubicle is formed by four side walls and the toilet is arranged on a first side wall. A first access door is arranged in a second side wall, which extends transversely to the first side wall and adjoins the first side wall. A surface which is designed to at least partially accommodate a wheelchair is provided within the toilet cubicle. The cabin module is configured to be installed with the second side wall transversely to the direction of flight. The first side wall is aligned with an external wall in the installed state.

The arrangement of the access door transversely to the toilet provides a space-saving access situation. The passenger entering the toilet cubicle, i.e. the user, has to perform a smaller turning movement to use the toilet in comparison with a toilet cubicle in which the access door is arranged opposite the toilet. The access situation in the transverse direction relative to the toilet entails improved user convenience.

In one example, a cabin module for an aircraft is provided. The cabin module has a sanitary unit, which is constructed with a toilet cubicle having a toilet. The toilet cubicle is formed by four side walls and the toilet is arranged on a first side wall. A first access door is arranged in a second side wall, which extends transversely to the first side wall and adjoins the first side wall.

The aircraft is an aeroplane, for example, preferably a passenger aeroplane. The aircraft can also be a helicopter or an airship.

The term "sanitary unit" refers to a cubicle in which there is a toilet. The sanitary unit can also have a washbasin within the toilet cubicle. The sanitary unit can furthermore also have a urinal within the toilet cubicle. The term lavatory or on-board toilet can also be used for the sanitary unit.

The sanitary unit is used as a structural unit in the cabin compartment of an aircraft, for example. The cabin compartment is formed substantially by a floor, which is inserted into a fuselage and which divides the fuselage volume into a cargo or service area situated underneath and a cabin area situated above, for example. For the cabin, the fuselage is provided on the inside with a fuselage lining or cabin lining, thus forming a cabin compartment. The side walls of the sanitary unit are connected to the cabin floor and to the cabin lining. The cabin compartment can also be referred to as the cabin interior.

The "cabin module" can also be referred to as the sanitary module. As the core element, the cabin module contains the sanitary unit.

The sanitary unit is designed to be aligned with an inner side of the fuselage or to rest against said inner side by means of the first side wall. The toilet is thus designed to ensure that the direction of use in the installed state is aligned transversely to a longitudinal axis of an aircraft.

The toilet has a direction of use aligned in the direction of a longitudinal central axis. The first access door is arranged in a lateral surface which extends substantially parallel to the direction of use, e.g. parallel to the direction of use.

The term "direction of use" of the toilet refers to a conventionally present central axis of a toilet bowl and also of a toilet seat. Thus, the term "direction of use" of the toilet also refers to an alignment of the user when said user is using the toilet in a sitting position.

For example, the direction of use of the toilet forms an angle of at most 120°, e.g. at most 90°, to a perpendicular to the second side wall. In one example, the angle is at most 80°.

In one example, the toilet is aligned transversely to the first side wall. The toilet has a direction of use aligned transversely to the first side wall, for example.

In one example, the toilet is aligned from the first side wall into the toilet cubicle. The toilet projects from the first side wall into the toilet cubicle, for example.

The first access door forms an access to the toilet cubicle which is aligned transversely to the direction of use. For seated use of the toilet, a user must merely perform a rotation through about 90° after entering the toilet cubicle.

In the case of persons with restricted mobility who use a wheelchair to move around, using the toilet is associated with a transfer from the wheelchair to the toilet. This procedure is also referred to as a transfer procedure.

Persons or passengers with restricted mobility are also referred to as PRMs (passengers with reduced mobility). For persons with restricted mobility, special wheelchairs are used on board aircraft, for example, these being adapted to the restricted dimensions within a cabin interior. These wheelchairs are also referred to as OBWCs (on-board wheelchairs).

Access transversely to the direction of use of the toilet means that a user of a wheelchair can enter the toilet cubicle and then has only to perform a transfer movement of about 90°.

Even in the case of a toilet cubicle which is narrow per se, the first access door can be made somewhat wider than an access on an end face. For example, an access door with a width of about 24 inches can be provided instead of a door with a width of about 20 inches, entailing easier access for people in a wheelchair.

A person in a wheelchair can thus enter the toilet cubicle in the wheelchair. For example, the wheelchair can be pushed at least partially into the toilet cubicle, or the wheelchair can be pushed completely into the toilet cubicle. Positioning the wheelchair directly next to the toilet, transversely to the direction of use of the toilet, means that the person then has only to perform a transfer movement of about 90° there from the wheelchair. In the case where the wheelchair has been pushed only partially into the toilet cubicle, a curtain can be provided to separate the entry area, into which the wheelchair is of course still projecting, from the remaining cabin area and the corridor area. This ensures the required private zone for the person with restricted mobility. For easier access, a door sill suitable for wheelchairs can be provided, i.e. one of low structural height, to enable the front wheels, in particular, to be pushed over.

The first access door can also be referred to as the primary access door. The second side wall forms a first access side with the first access door.

The term "access door" refers to a toilet door. The term door can also be used instead of access door.

Within the toilet cubicle, hand grips can be provided in the vicinity of the washbasin, the washstand, the toilet and/or the door, and/or a peripheral hand rail for holding can also be provided in order to facilitate the transfer movements.

According to one example, a second access door is arranged in a third side wall, which extends transversely to the second side wall and adjoins the second side wall. As an option, provision is made for the possibility of connecting the toilet cubicle directly to an aisle region by means of the second access door.

For example, the second access door forms an access for a helper when the toilet is being used by a person with restricted mobility (PRM).

In the case of persons with restricted mobility, a distinction can be drawn between various categories, depending on the degree of restriction:

In a first category, the person can stand up from the wheelchair unaided and turn around to use the toilet, and vice versa. The term "standing independent transfer" is also used for this category.

In a second category, the person can only stand up from the wheelchair with support, i.e. assistance, and turn with assistance and sit down on the toilet to use the toilet, and vice versa. The term "standing assisted transfer" is also used for this category.

In a third category, the person cannot stand up from the wheelchair but can perform a direct transfer movement from the wheelchair to a toilet seat independently in order to use the toilet, and vice versa. The term "seated independent transfer" is also used for this category.

In a fourth category, the person can perform a direct transfer movement from the wheelchair to a toilet seat only with support, i.e. assistance, in order to use the toilet, and vice versa. The term "seated assisted transfer" is also used for this category.

In the version with the transversely arranged access door, the sanitary unit is suitable for the first category and the third category. However, this version can also be used for the second category and the fourth category since there is still sufficient space for an assistant within the toilet cubicle by virtue of space-saving interior fittings, e.g. an obliquely inserted washbasin.

In the version with the additional second access door, the sanitary unit is suitable for the second category and the fourth category. The second access allows assistance from several sides. Of course, the version with the additional second access door is also suitable for the first and the third category, however.

For additional support, a mobility system suspended overhead is provided in another example, in which the passenger is additionally supported by a kind of belt-seat device to enable them to be raised vertically and moved laterally.

The OBWC can have folding armrests for the transfer procedure, for example.

The third side wall forms a second access side with the second access door. The third side wall is situated opposite the first side wall.

The second access door can also be referred to as the secondary access door.

A fourth side wall adjoins the third side wall and has a connection to the first side wall. The fourth side wall is situated opposite the second side wall.

A washstand arrangement with a washbasin is provided on the fourth side wall, for example.

The first access door and the second access door are provided on two adjoining side walls which extend transversely to one another. One of the two access doors is aligned transversely to the direction of use of the toilet, and the other of the two access doors is aligned longitudinally with respect to the direction of use of the toilet.

The second access door is designed as a folding door, for example.

The first access door and the second access door are arranged at right angles to one another.

According to one example, the second side wall and the third side wall are connected at right angles by a connection region. The cabin module has a connecting door, which adjoins the connection region and is designed to separate from an aisle region situated in front thereof a secondary access region, which is situated in front of the second access door, outside the toilet cubicle.

The connecting door can also be referred to as the third access door since it forms an access to an entry area of the toilet cubicle. Since the third access door can be used to separate off an entry area and the toilet cubicle is accessible from the entry area via the second door, a person standing in the entry area can assist a toilet user with restricted mobility. The toilet cubicle can be temporarily enlarged by the entry area that can be added to it.

Together with the second access door, the connecting door forms a temporarily enlarged sanitary unit.

According to one example, a frame structure is provided, which adjoins the toilet cubicle on a side opposite the first side wall. The frame structure can be connected to a primary structure of a fuselage structure. The frame structure has at least two vertical structural elements, which form a first frame side, which adjoins the second side wall and in which the connecting door is provided. At least the first access door and the connecting door are secured on the frame structure.

The structural elements are a reinforced panel or a reinforced profile, for example.

The frames have connections which are, for example, horizontal, e.g. at the top. Alternatively or in addition, horizontal connections are provided at the bottom.

The frames and modules are secured on an existing fastening system in the floor region, for example, e.g. on fastening rails laid in a grid pattern (floorgrid). The frames and modules can also be secured at the top in the ceiling region.

The frame structure adjoins the third side wall in the region of the aisle region, i.e. in the region of the access region.

According to one example, the frame structure has four vertical structural elements, which can be connected to a supporting structure and form four frame sides, between which a spatial zone which adjoins the toilet cubicle and is separated from the latter by the third side wall is formed. As an option, there is provision to form the third side wall in a second frame region.

The frame structure has load-bearing vertical posts, which can be connected to a supporting structure of the fuselage, for example, in order to make available a load-bearing function for a door with an integrated flight attendant seat during the use of the seat (the use of the flight attendant seat).

The structural elements, also referred to as supporting elements, can be integrated into wall segments or embodied as a reinforced wall segment in order to increase stability so as to introduce the force into the primary structure or dissipate the loads, e.g. the forces and loads of a flight attendant seat.

The frame structure is an additional structure to the sanitary unit. The frame structure forms an extension of the sanitary unit and defines the entry area serving as an extension of the toilet cubicle.

The walls of the sanitary unit are constructed with connections capable of accommodating tolerances and movements and nevertheless ensuring sealed connection, for example. The connections are designed for a range of different gap dimensions, for example.

The connections are designed to cover the "system gap", which may be present in order to allow movement of the modules relative to one another attributable, inter alia, to deformations of the fuselage during flight.

According to one example, a cockpit door can be secured in a third frame region, which is arranged opposite the first frame region. One option envisaged is to provide a fourth frame region, which is arranged opposite the second frame region and on which a partition wall relative to a galley can be secured. It is also possible for the fourth frame region to form the partition wall itself.

According to one example, the first access door and the connecting door can be locked from the cockpit when the toilet cubicle and the access region are unused, and the toilet cubicle is accessible from the cockpit via the access region and the second access door.

Thus, the toilet can also be reached from the cockpit without the cockpit access being accessible from the cabin area. In other words, when the (passenger) toilet is being used by the cockpit personnel, access to the cockpit from the outside from the cabin is continuously obstructed, despite the cockpit door being open.

For this purpose, a cubicle monitoring system and a locking system with locking logic are provided, for example. By means of a spy hole in the cockpit door, the cubicle in front thereof can be viewed. In one example, sensors are provided for monitoring the lavatory, said sensors indicating whether the toilet cubicle is being used or not in addition to the engaged/vacant indication.

The first access door and the connecting door can be locked from the cockpit so that the toilet can then be used. The second access door can likewise be lockable from the cockpit.

According to one example, at least one out of the group comprising the first access door and the connecting door can be constructed with a flight attendant seat, which can be used temporarily during flight.

In this case, the flight attendant seat is of integral design with the door, i.e. the seat is arranged in the door. For use, a seat surface can be folded out. For load bearing on both sides while the flight attendant seat is in use, provision is made, for example, for the door leaf in which the flight attendant seat is arranged to be held on both sides in the closed state, e.g. by a lock on one side, said lock extending vertically over a certain range, and by reinforced hinges on the other side; or by locking on both sides at a plurality of points distributed vertically.

Flight attendant seats can be used during the take-off and landing phases, for example, when all the passengers are (must be) buckled into their seats and use of the on-board toilets is not permitted. Flight attendant seats can also be used during turbulent phases, for example, when the use of the on-board toilets is likewise not permitted. A flight attendant seat is also referred to as a CAS (cabin attendant seat).

According to an embodiment of the invention, an aircraft is also provided, which has a fuselage region and a cabin interior, which is arranged within the fuselage region. The cabin interior has a cabin module according to one of the preceding examples. The aircraft has a longitudinal axis, which is aligned with the direction of flight; and the second side wall of the toilet cubicle extends transversely to the longitudinal axis of the aircraft.

According to one example, the aircraft has, on the port side, a first fuselage door, which is arranged in the forward region between a cockpit and a region containing passenger seats and forms an entry and exit for the cabin interior. The sanitary unit is arranged next to the entry and exit.

The sanitary unit is arranged immediately, i.e. directly, next to the entry and exit. The entry and exit is also referred to as the A exit, and the toilet cubicle is also referred to as the A lavatory.

The sanitary unit is arranged in front of the entry and exit as viewed in the direction of flight, for example, that is to say on the left of the entry and exit when entering on the port side.

In one example, provision is made for a wall segment constructed with a flight attendant seat that can be used during take-off and landing phases and also during flight to be arranged to the right of the entry and exit (viewed in the direction of entry). By means of a mobile space dividing element, e.g. a curtain, the flight attendant seat can be separated at least visually from the aisle region and the region of the primary access door of the toilet cubicle.

In another example, provision is made, as an alternative or in addition, for a further flight attendant seat to be arranged to the left of the entry and exit (viewed in the direction of entry) on the wall of the sanitary unit, next to the first access door.

The concept of the toilet cubicle with the access door arranged transversely to the direction of use can also be employed in existing passenger aeroplanes without the need for major modifications to the fuselage.

According to one example, an entry/exit region is provided on the inside of the first fuselage door, and the first access door opens into the entry/exit region.

According to one example, the cabin interior has an arrangement of passenger seats in which the passenger seats are arranged on both sides of a central aisle. As an option, provision is made for a flight attendant seat, the seat position of which is aligned counter to the direction of flight, to be integrated into the connecting door. The flight attendant seat is arranged in alignment with the central aisle, thus enabling a person sitting on the flight attendant seat to see down the central aisle.

The centrally arranged flight attendant seat on the access door allows an overview of the cabin during take-off and landing phases, e.g. on passenger aeroplanes which have just one central aisle along the cabin, from which the seat rows extend to the right and left. The flight attendant seat in the centre is also referred to as a direct view flight attendant seat (direct view CAS). The flight attendant seat in the centre can also be used when the toilet cubicle is not being used by a person with restricted mobility or when the second access door is not required.

Apart from the take-off and landing phases, the cabin can also be surveyed during movements on the airport apron. These three phases are also referred to as TTL (taxi, take-off, landing).

In other words, the arrangement of the passenger seats of the cabin interior has a multiplicity of rows, in each of which a plurality of seats is provided, wherein a first group of seats extends from the outer wall to the central aisle and a second group of seats extends from the central aisle to the outer wall.

The arrangement has only the central aisle as a longitudinal aisle and is also referred to as a single-aisle configuration, in which only one aisle region is provided.

According to one example, a floor hatch is arranged in a floor region of the secondary access region in order to make available temporary access to a descent into a rest compartment situated below.

According to an embodiment of the invention, a method for creating a cabin module for an aircraft is also provided. The method has the following steps:
a) providing a sanitary unit with a toilet cubicle, which has a toilet; wherein the toilet cubicle is formed by four side walls;
b) arranging the toilet on a first side wall; and
c) arranging a first access door in a second side wall, which extends transversely to the first side wall and adjoins the first side wall.

A surface which is designed to at least partially accommodate a wheelchair is provided within the toilet cubicle. The cabin module is configured to be installed with the second side wall transversely to a direction of flight. The first side wall is aligned with an external wall in the installed state.

In one example, a method for creating a cabin module for an aircraft is provided. The method has the following steps:
a) providing a sanitary unit with a toilet cubicle, which has a toilet; wherein the toilet cubicle is formed by four side walls;
b) arranging the toilet on a first side wall; and
c) arranging a first access door in a second side wall, which extends transversely to the first side wall and adjoins the first side wall.

According to an aspect of the invention, a use of a cabin module according to one of the preceding examples in an aircraft is envisaged.

According to one aspect of the invention, it is envisaged that a toilet cubicle has a door which is arranged transversely to the direction of the toilet arranged in the toilet cubicle in order to ensure easier access for a passenger in a wheelchair. By virtue of the option of a second door, the toilet cubicle can be temporarily extended, e.g. for support by a helper.

As an option, a combination of the lateral, i.e. transversely arranged, access door with the additional (access) door is provided.

As an option, a combination of the lateral, i.e. transversely arranged, door with the flight attendant seat integrated therein is provided.

As a further option, a combination of the lateral, i.e. transversely arranged, access door with the frame used to secure the lateral access door to the integrated flight attendant seat is provided.

As a further option, a combination of the lateral, i.e. transversely arranged, door with the additional (access) door and the frame surrounding the entry area in front of the second access door and serving to secure the doors to the flight attendant seats is provided.

It should be noted that the features of embodiment examples of the module also apply to embodiments of the aircraft and of the method and vice versa. Moreover, features can be combined freely, unless explicitly stated otherwise.

These and further aspects of the invention will become apparent with reference to and in consideration of the following statements.

BRIEF DESCRIPTION OF THE DRAWINGS

Embodiment examples of the invention will be explained in greater detail below by means of the attached drawings.

DETAILED DESCRIPTION

Figure 1:
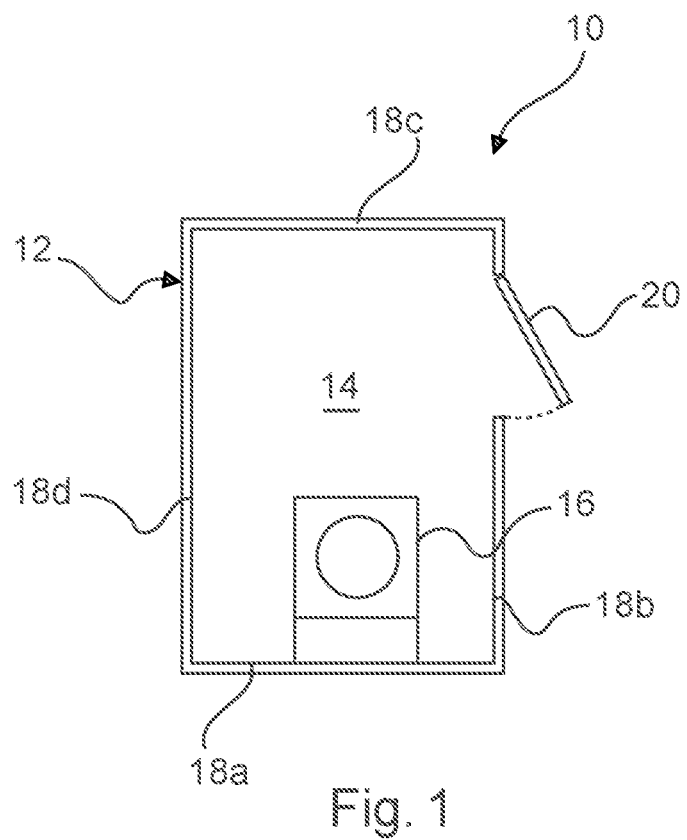
FIG. 1 shows an example of a cabin module having a sanitary unit in a schematic plan view.

FIG. 1 shows a cabin module 10 for an aircraft. The cabin module 10 has a sanitary unit 12. The sanitary unit 12 is constructed with a toilet cubicle 14, which has a toilet 16. The toilet cubicle 14 is formed by four side walls, which are indicated by reference numerals 18. The toilet 16 is arranged on a first side wall 18a. A first access door 20 is arranged in a second side wall 18b, which extends transversely to the first side wall 18a and adjoins the first side wall 18a. As an option, a surface which is designed to at least partially accommodate a wheelchair is provided within the toilet cubicle 14. The cabin module 10 is configured to be installed with the second side wall 18b transversely to a direction of flight. The first side wall 18a is aligned with an external wall in the installed state.

Figure 2:
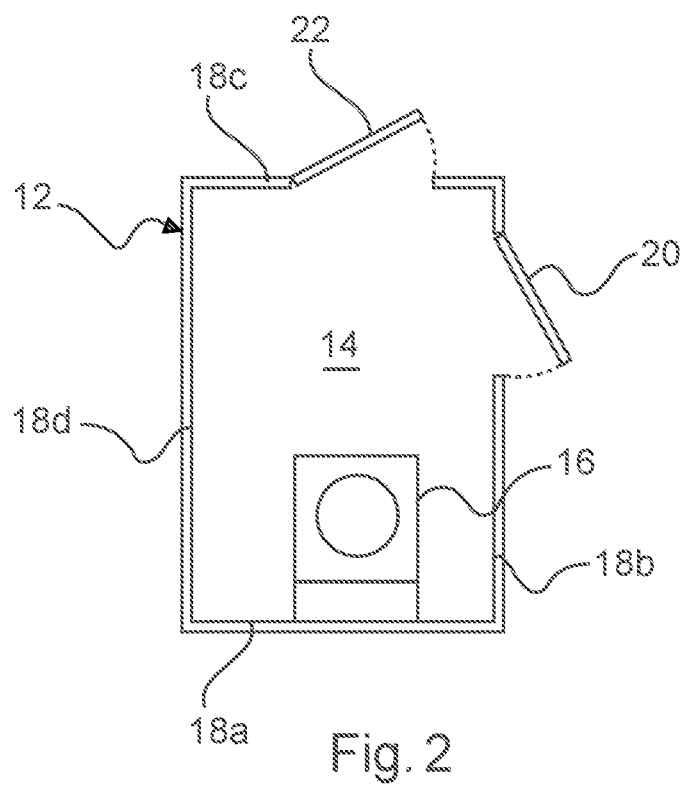
FIG. 2 shows another example of a cabin module in a schematic plan view.

FIG. 2 shows another example of the cabin module 10, in which a second access door 22 is arranged in a third side wall 18c, which extends transversely to the second side wall 18b and adjoins the second side wall 18b.

Figure 3:
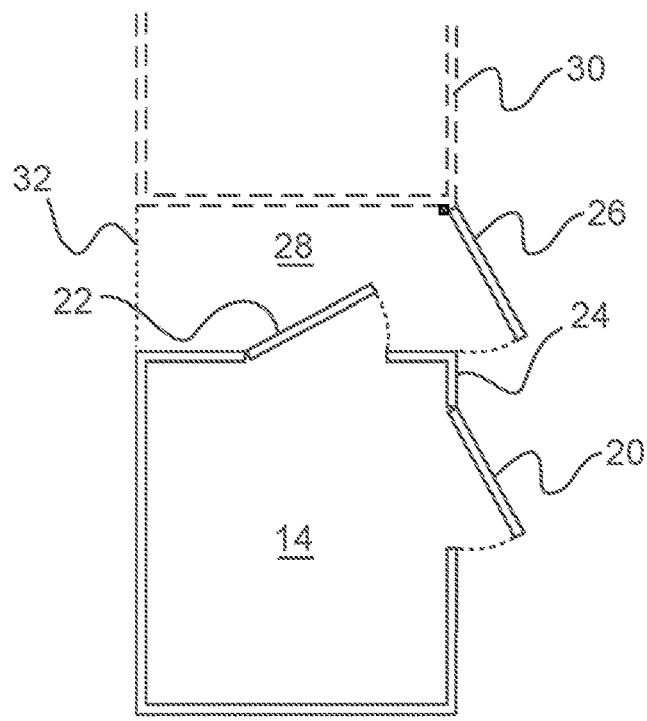
FIG. 3 shows a diagram of yet another example of a cabin module.

FIG. 3 shows an example of the cabin module 10 in which, as an option, the second side wall 18b and the third side wall 18c are connected at right angles by a connection region 24. The cabin module 10 has a connecting door 26, which adjoins the connection region 24 and is designed to separate from an aisle region a secondary access region 28, which is situated in front of the second access door 22, outside the toilet cubicle 14. The aisle region can be formed between the sanitary unit 12 and a galley module 30 (illustrated in dashed lines), for example, and can be delimited by a cockpit door 32 at the end on the left in the figure.

Figure 4:
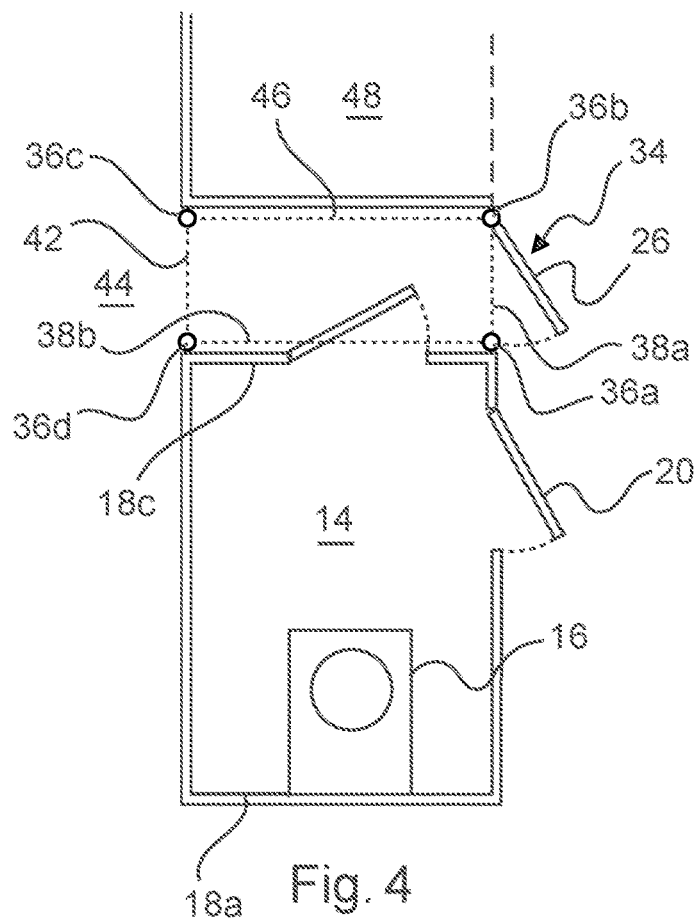
FIG. 4 shows another diagram of another example of a cabin module.

FIG. 4 shows an example of the cabin module 10 in which, as an option, a frame structure 34 is provided, which adjoins the toilet cubicle 14 on a side opposite the first side wall 18a. The frame structure 34 can be connected to a primary structure of a fuselage structure. For this purpose, vertical structural elements are provided, these being indicated by reference numerals 36.

In one option, the frame structure 34 has at least two vertical structural elements 36a, 36b, which form a first frame side 38a, which adjoins the second side wall 18b and in which the connecting door 26 is provided. The first access door and the connecting door 26 are secured on the frame structure 34.

In another example, which is likewise shown as an option in FIG. 4, the frame structure 34 has four of the vertical structural elements 36, which can be connected to a supporting structure and form four frame sides, which are indicated by reference numerals 38 and are illustrated in dashed lines. A spatial zone 40 which adjoins the toilet cubicle 14 and is separated from the latter via the third side wall 18c and the second access door 22 is formed between the vertical structural elements.

As an option, there is provision to form the third side wall 18c in a second frame region 38b.

In another example, which is likewise shown as an option in FIG. 4, a cockpit door 42, which leads to a cockpit 44 arranged to the left of the cockpit door 42 in the drawing, can be secured in a third frame region 38c, which is arranged opposite the first frame region 38a.

In another example, which is likewise shown as an option in FIG. 4, a fourth frame region 38d is provided, which is arranged opposite the second frame region 38b and is designed as a partition wall 46 with respect to a galley 48 or some other spatial or usage unit or on which such a partition wall can be secured.

In an option which is not shown specifically, the first access door 20 and the connecting door 26 can be locked from the cockpit 44 when the toilet cubicle 14 and the access region 40 are free, i.e. are not being used. The toilet cubicle 14 is then accessible from the cockpit 44 via the access region 40 and the second access door 22.

Figure 5:
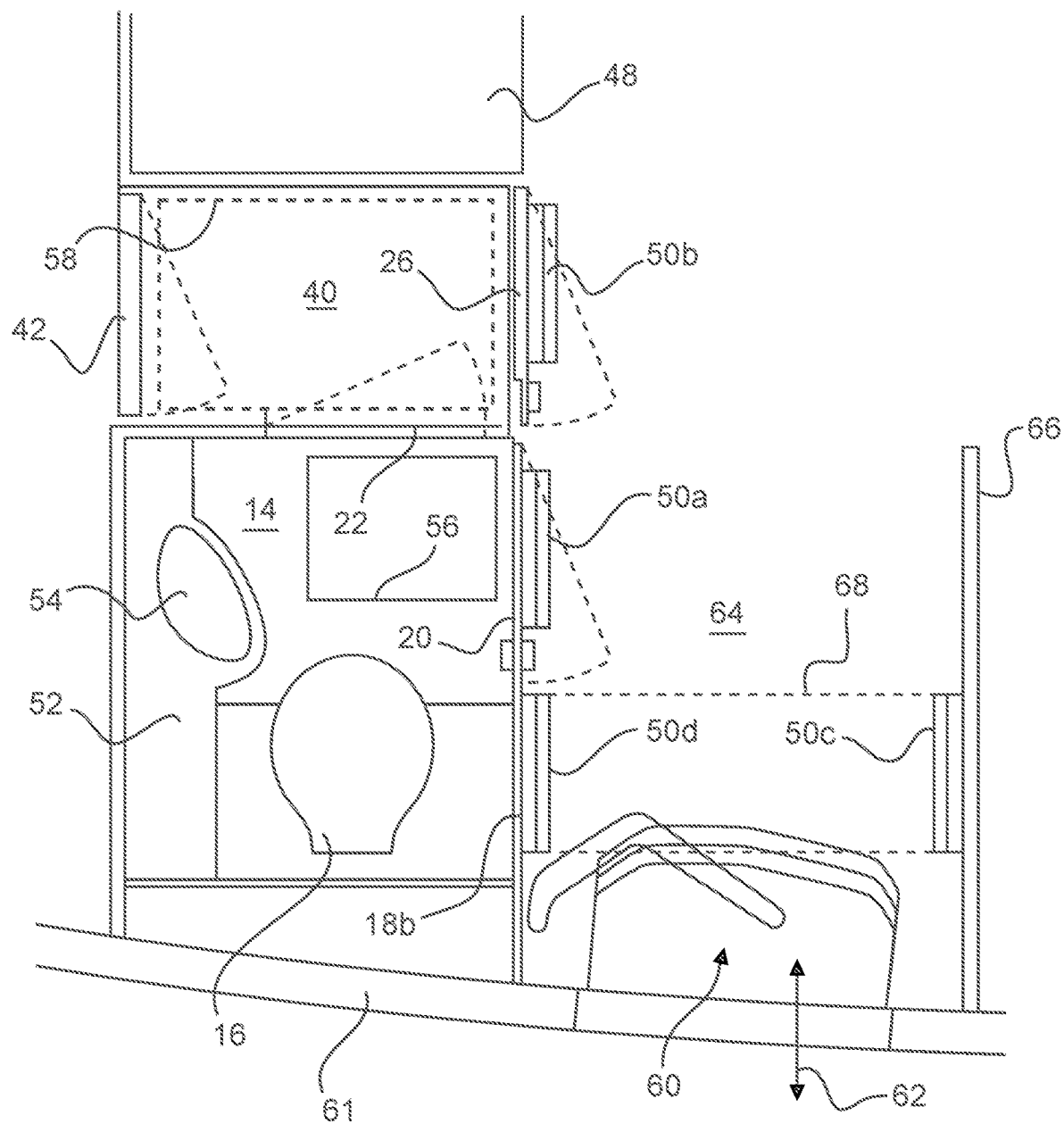
FIG. 5 shows a schematically illustrated horizontal section through an example of a cabin module.

FIG. 5 shows, as an option, that doors can be equipped with a flight attendant seat 50, which is integrated into the door leaf and which can be used temporarily during flight. A first flight attendant seat 50a is provided on the first access door 20, for example. As an alternative or additional variant, a second flight attendant seat 50b is formed on the connecting door 26. (The terms "first", "second" etc. are used merely for designation and do not indicate the total number of flight attendant seats present.)

A washstand 52 with a washbasin 54 is shown as an example in FIG. 5. The washbasin 54 can be arranged obliquely in order to face a person situated in front of the toilet. In this case, for example, the washbasin 54 projects in a region close to the toilet 16, and therefore the space situated in front of the toilet is impaired only to a minimal extent by the projecting washbasin.

Depending on the width of the module, the foot area below the washbasin can be free in order to allow a person to stand more comfortably near to the washbasin. The region under the washstand can furthermore also be used as a space for the feet of the PRM in order to accommodate the wheelchair as completely as possible in the lavatory in the case of narrow lavatories and to continue to allow ergonomic transfer of the PRM. Since, in the case of a wheelchair, there is often a footrest at the front which projects forwards beyond the front wheels of the wheelchair and on which the feet are placed, which likewise project obliquely forwards, the free region underneath the washstand enables the wheelchair to be moved further into the toilet cubicle. For this purpose, the free region can have a corresponding free height from the floor.

As an option, the washbasin is also provided for the other examples, in which no washbasin is shown in the figures.

A rectangle 56 indicates a wheelchair, e.g. an OBWC (on-board wheelchair). The wheelchair has entered the toilet cubicle 14 from the right (in the figure) through the first access door 20. The user can now perform the transfer movement from the wheelchair to the toilet 16.

In the case where the passenger in the wheelchair requires help, a helper can enter the access region 40 via the connecting door 26 and get to the person in the wheelchair via the second access door 22.

As a further option, FIG. 5 shows that a floor hatch 58 (shown in dashed lines) is arranged in a floor region of the secondary access region 28 or of the spatial zone 40 in order to make available temporary access to a descent into a rest compartment situated underneath for the crew.

As an option, FIG. 5 (and FIG. 7) show(s) that the aircraft has a first fuselage door 60, which is arranged in the forward region, on the port side, between the cockpit 44 and a region containing passenger seats (see FIG. 9) and forms an entry and exit 62 for the cabin interior. The fuselage structure with the outer skin is indicated by reference numeral 61. The sanitary unit 12 is arranged next to the entry and exit 62. For example, an entry/exit region 64, from which the passenger can get into the longitudinal or central aisle, is provided on the side of the first fuselage door 60 facing the cabin. The first access door 20 of the on-board toilet is opened into the entry/exit region (64).

In this case, the first access door 20 pivots open in such a way that people cannot run up against the front face of the door in the direction of escape to the outside. A similar pivoting direction can also be provided, for example, for the connecting door 26 and the second access door 22.

The doors, i.e. the first access door 20, the second access door 22 and the connecting door 26 are furthermore arranged in such a way that they open "outwards" in the direction of escape of a passenger from the toilet cubicle 14 or the connection region 24, i.e. in the direction of escape. The cockpit door 42 can likewise open in the direction of escape into the connection region.

As an option, FIG. 5 shows that a wall segment 66, which is constructed with a third flight attendant seat 50c that can be used during take-off and landing phases and also during flight, is arranged to the right of the entry and exit 62 (viewed in the direction of entry). By means of a mobile space dividing element 68, e.g. a curtain, the third flight attendant seat 50c can be separated at least visually from the aisle region and the region of the first access door 20 of the toilet cubicle 14.

In addition or as an alternative, a further, i.e. fourth, flight attendant seat 50d, can be arranged opposite, this being provided next to the first access door 20 on a region of the first side wall 18b.

Figure 6:
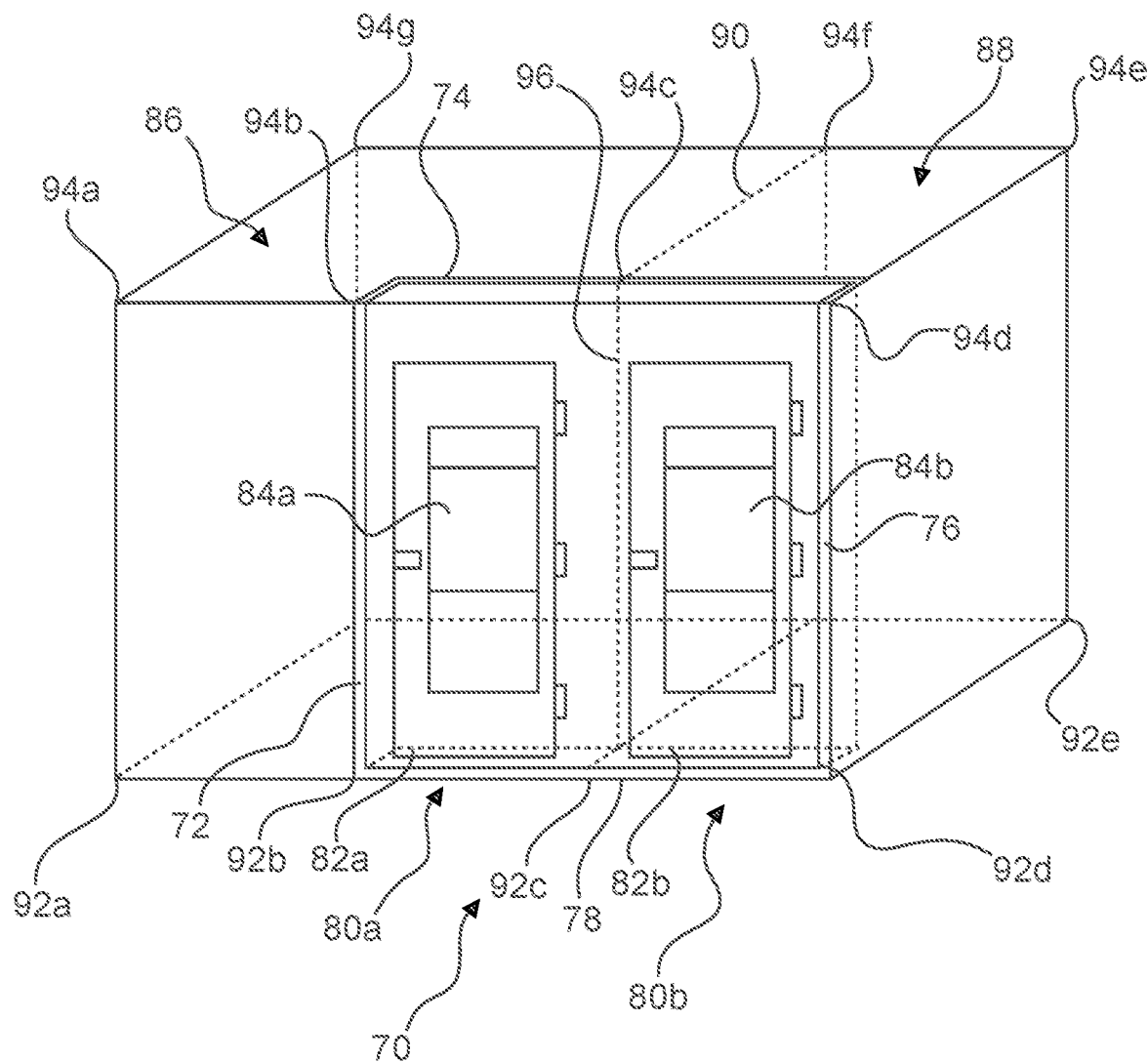
FIG. 6 shows a schematic illustration of an example of a frame-type submodule.

FIG. 6 shows a schematic overview of a frame-type submodule, which has a frame 70 with a first side 72, an upper region 74, a second side 76 and a lower region 78. A first half 80a and a second half 80b are provided in the frame 70. A first door 82a, which forms the first access door 20 of the toilet cubicle, is provided in the first half 80a. A second door 82b, which forms the connecting door 26, is provided in the second half 80b. The first door 82a is formed with a first integrated flight attendant seat 84a, and the second door 82b is formed with a second integrated flight attendant seat 84b.

The frame 70 extends partially across a toilet cubicle region 86, which forms the toilet cubicle 14, and across a corridor region 88, which forms the connection region 24. A partition wall between the two regions is indicated by a dashed line 90. The frame 70 replaces as it were part of the wall structure of the toilet cubicle. The frame 70 forms a reinforcement, to which the two doors with the flight attendant seats can be attached. While the flight attendant seats are in use, when the doors are closed, the frames offer the required support for the forces resulting from the use of the flight attendant seats.

The holding points on the supporting structures can then be of correspondingly stronger construction.

To secure the various submodules or components, such as the sanitary unit, frames or galley module, lower fastening or holding points 92a, 92b, 92c, 92d, 92e can be provided, e.g. for securing on retention rails or fixed points in the floor structure.

To secure the various submodules or components, such as the sanitary unit, frames or galley module, it is also possible for upper fastening or holding points 94a, 94b, 94c, 94d, 94e, 94f, 94g to be provided, e.g. for securing on retention rails or fixed points in the ceiling structure.

For example, the sanitary unit (lavatory) is secured on the floor structure by means of four fastening points and on the ceiling structure by means of further fastening points. Not all of these are shown in FIG. 6, only the lower fastening point 92a being shown and, as an example, the upper fastening points 94a and 94g on a lateral fuselage region, and that on the upper fastening point 94f, at which a rod element (rod) can establish the connection at the top to the upper fuselage region, for example.

The frame is secured on the floor structure and on the ceiling structure by means of further fastening points, which are independent of the fastening points of the sanitary unit. Likewise, not all of these are shown in FIG. 6, only the lower fastening points 92b, 92c and 92d being shown and the upper fastening points 94b, 94c and 94d, for example. The connection at the top to the fuselage structure at the upper fastening points can be made by means of rod-shaped tension/compression elements, for example.

It should be noted that FIG. 6 shows only a schematic illustration, in which a lateral taper of the sanitary unit due to the curvature of the fuselage is not illustrated, for example.

At the bottom, the sanitary unit can be secured at four points. At the top, in the centre of the fuselage, the sanitary unit, i.e. lavatory, can be secured by means of one or even two points since, although the flight attendant seats are provided on doors leading to the sanitary unit, for example, these doors are held on the frame, which is secured separately from the sanitary unit. The frame relieves the load on the structure of the sanitary unit. The frame is of reinforced design in order to dissipate the additional loads due to the flight attendant seats downwards and upwards in a defined manner via the frame.

The frame is also separate from the sanitary unit at the lower points, i.e. the frame is decoupled.

The frame spans two spatial units, for example, i.e. the sanitary unit and the entry corridor or entry region situated between the sanitary unit and a galley unit situated opposite relative to the longitudinal axis. The frame as it were intersects part of the wall segments of the two adjoining compartments or replaces them in the region in which the frame (with the doors) itself forms the corresponding wall segments.

The other wall segments, e.g. the right-hand wall in FIG. 6, towards a galley region, can be secured in corresponding fashion. Between the wall segments and the frame module it is possible to provide connections, which bring about decoupling of the relative movement between the modules or the submodule and the cabin walls, for example.

A door post 96, which is arranged in a manner decoupled from the frame 70 and serves to accommodate a latch of the second access door 22 (not shown), is provided on the sanitary unit for the second access door 22. In FIG. 6, the door post 96 is at it were arranged behind the region between the two doors 82a and 82b and forms that end of the partition wall 90 between the toilet cubicle region 86 and the corridor region 88 which is at the rear when viewed in the direction of flight.

In one variant, provision is made for the frame to be only half as wide and to extend over only one door area. The other door is then attached laterally to the frame. It is possible, for example, for the frame to be provided only in the region of the corridor region 88. The second door 82a is then provided within the frame, and the first door is secured laterally on the frame in a movable manner.

Figure 7:
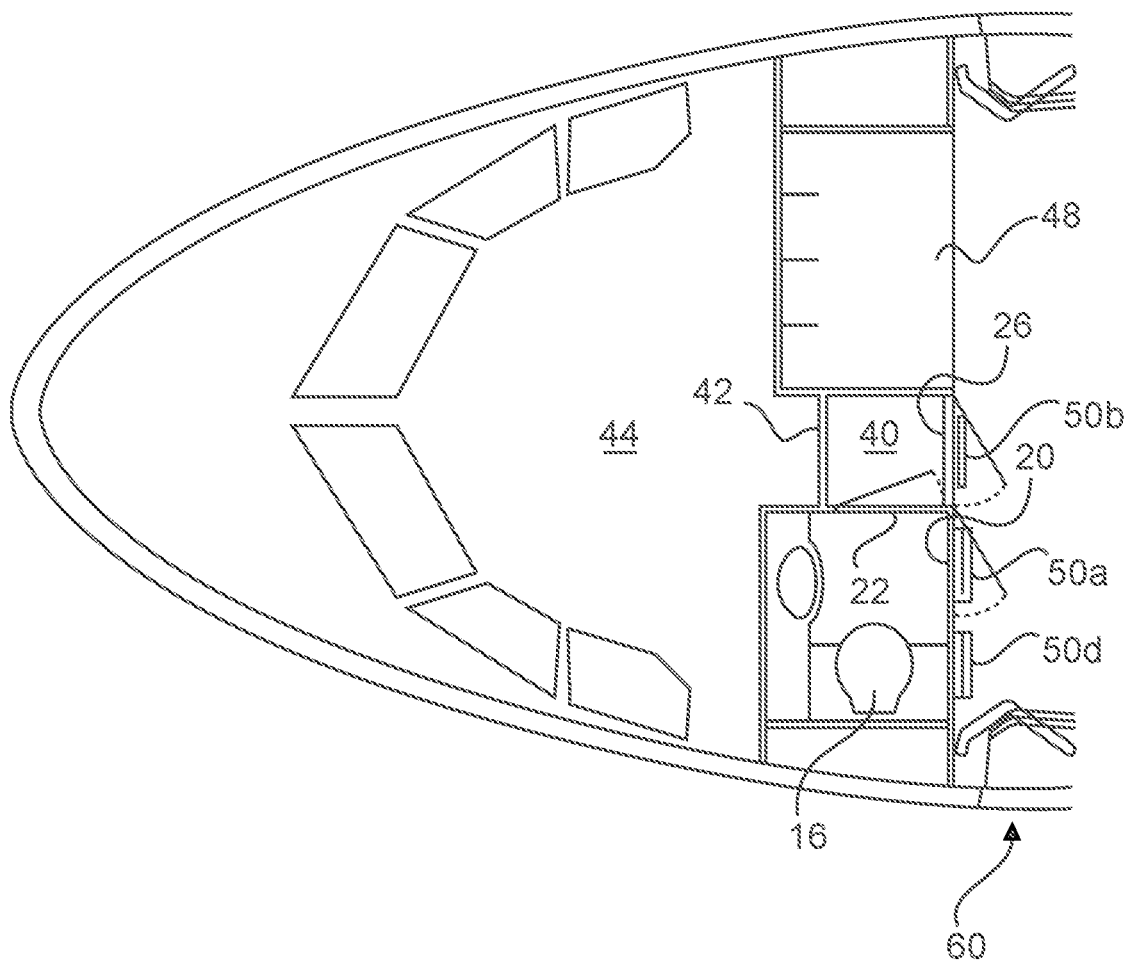
FIG. 7 shows a schematic horizontal section through another example of a cabin module in conjunction with a cockpit arranged in the forward region of an aircraft.

FIG. 7 shows, as an option, an arrangement of the cockpit door 42 offset rearwards in the direction of flight.

Figure 8:
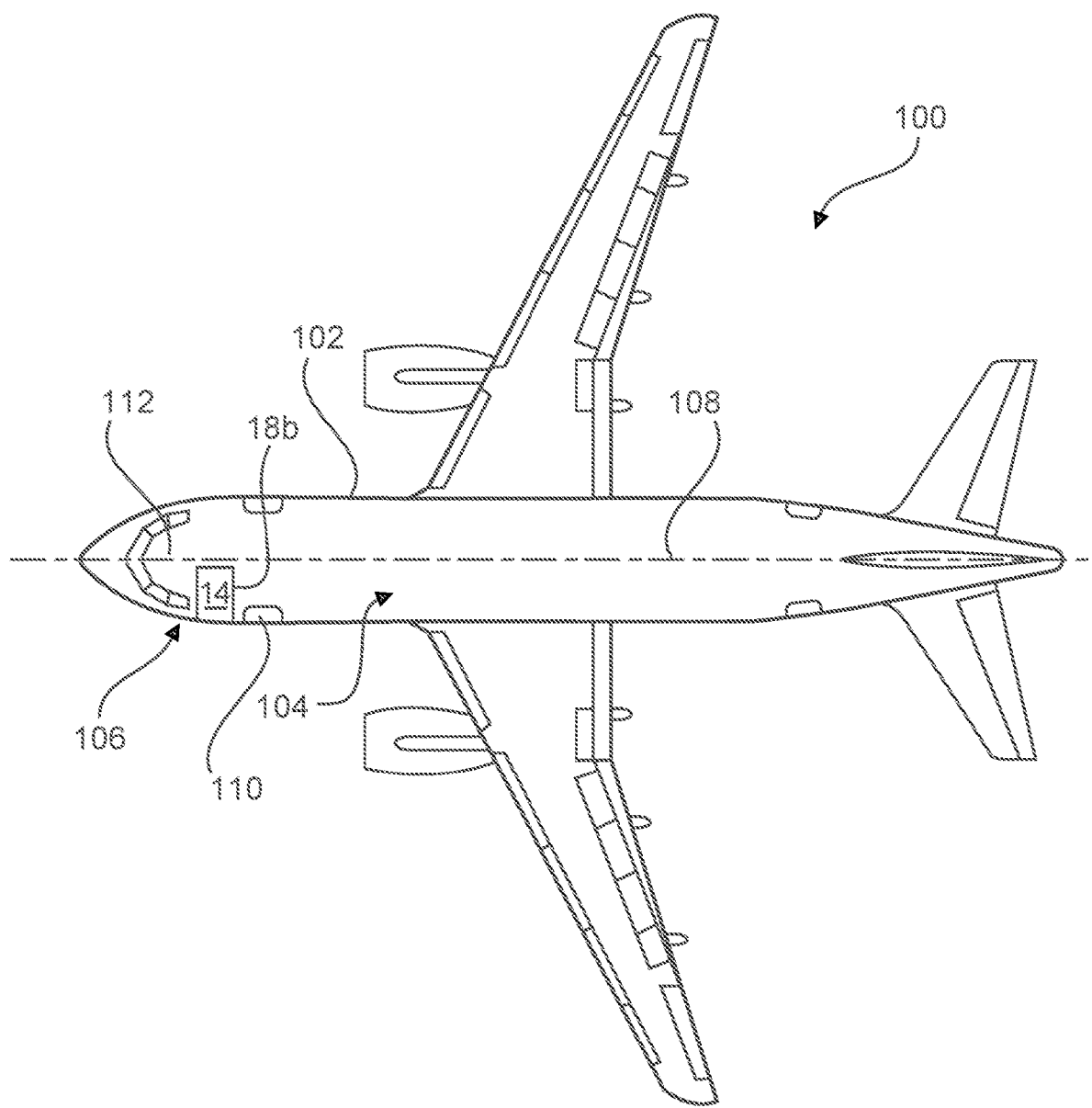
FIG. 8 shows an example of an aircraft with a cabin interior arranged within a fuselage region and having a cabin module.

FIG. 8 shows an example of an aircraft 100 having a cabin interior 104, which is arranged within a fuselage region 102 and has a cabin module 106 which is designed as one of the stated examples of the cabin module 10. The aircraft 100 has a longitudinal axis 108, which is aligned with the direction of flight. The second side wall 18b of the toilet cubicle 14 extends transversely to the longitudinal axis 108 of the aircraft 100.

Figure 9:
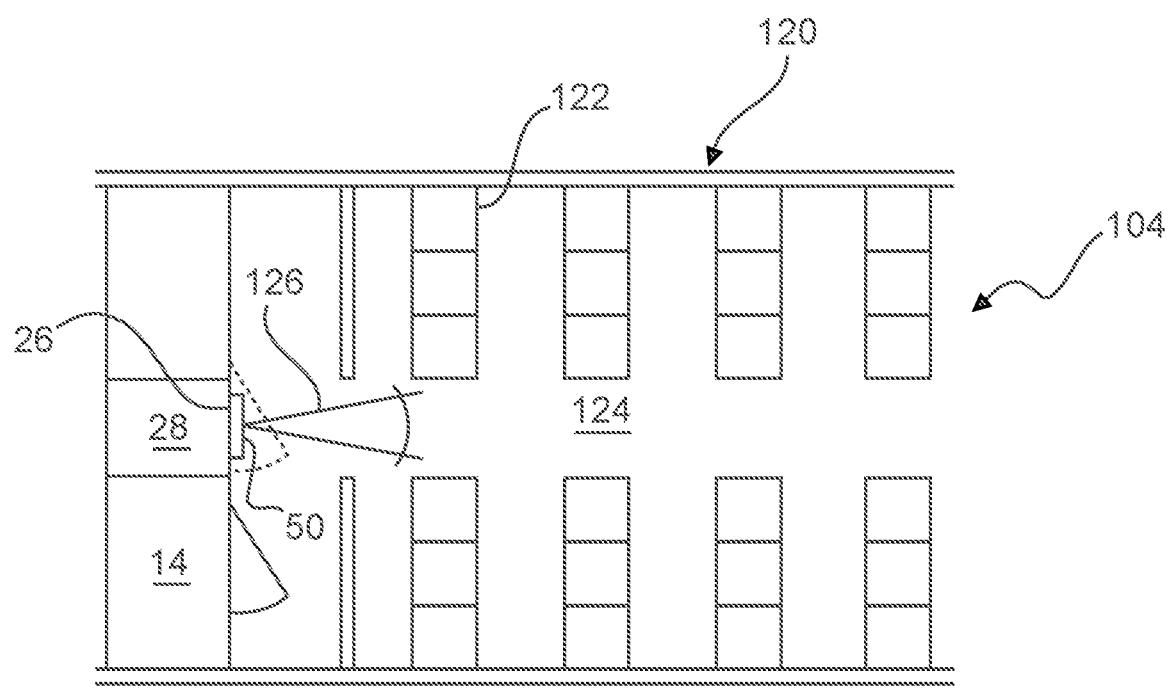
FIG. 9 shows a segment of a cabin interior of another example.

FIG. 9 shows an option in which provision is made for the cabin interior 104 to have an arrangement 120 of passenger seats 122 in which the passenger seats 122 are arranged on both sides of a central aisle 124. For example, provision is made for a flight attendant seat 50, e.g. the second flight attendant seat 50b, the seat position of which is aligned counter to the direction of flight, i.e. towards the rear, to be integrated into the connecting door 26. The flight attendant seat 50 is arranged in alignment with the central aisle 124, thus enabling a person sitting on the flight attendant seat to see down the central aisle 124, as indicated by the viewing angle symbol 126. This facilitates uninterrupted visual monitoring, even during the take-off and landing phases.

Figure 10:
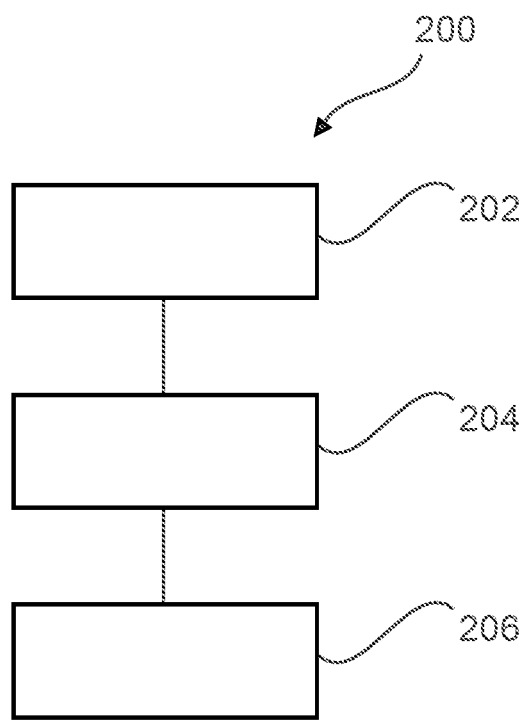
FIG. 10 shows schematically steps of one example of a method for creating a cabin module for an aircraft.

FIG. 10 shows a method 200 for creating a cabin module for an aircraft. The method 200 has the following steps:
  in a first step 202, also referred to as step a), a sanitary unit with a toilet cubicle, which has a toilet, is provided. The toilet cubicle is formed by four side walls.

in a second step 204, also referred to as step b), the toilet is arranged on a first side wall.

in a third step 206, also referred to as step c), a first access door is arranged in a second side wall, which extends transversely to the first side wall and adjoins the first side wall.

The embodiment examples described above can be combined in various different ways. In particular, it is also possible to use aspects of the method for embodiments of the devices and application of the devices and vice versa.

For the sake of completeness, it should be noted that "comprising" does not exclude any other elements or steps and "a" or "an" does not exclude a multiplicity. It should furthermore be noted that features or steps which have been described with reference to one of the above embodiment examples can also be used in combination with other features or steps of other embodiment examples described above. Reference signs in the claims should not be regarded as restrictive.

While at least one exemplary embodiment of the present invention(s) is disclosed herein, it should be understood that modifications, substitutions and alternatives may be apparent to one of ordinary skill in the art and can be made without departing from the scope of this disclosure. This disclosure is intended to cover any adaptations or variations of the exemplary embodiment(s). In addition, in this disclosure, the terms "comprise" or "comprising" do not exclude other elements or steps, the terms "a" or "one" do not exclude a plural number, and the term "or" means either or both. Furthermore, characteristics or steps which have been described may also be used in combination with other characteristics or steps and in any order unless the disclosure or context suggests otherwise. This disclosure hereby incorporates by reference the complete disclosure of any patent or application from which it claims benefit or priority.

The invention claimed is:

1. A cabin module for an aircraft, the cabin module comprising a sanitary unit,
   wherein the sanitary unit comprises a toilet cubicle with a toilet,
   wherein the toilet cubicle is formed by four side walls and the toilet is arranged on a first side wall,
   wherein a first access door is arranged in a second side wall extending transversely to the first side wall and adjoining the first side wall,
   wherein the toilet cubicle further comprises a surface configured to at least partially accommodate a wheelchair,
   wherein the cabin module is configured to be installed with the second side wall transversely to the direction of flight,
   wherein the first side wall is aligned with an external wall in the installed state,
   the cabin module comprising a frame structure adjoining the toilet cubicle on a side opposite the first side wall,
   wherein the frame structure is configured to be connected to a primary structure of a fuselage structure,
   wherein the frame structure has at least two vertical structural elements forming a first frame side adjoining the second side wall and in which the connecting door is provided, and
   wherein at least the first access door and the connecting door are secured on the frame structure.

2. The cabin module according to claim 1, wherein a second access door is arranged in a third side wall extending transversely to the second side wall and adjoining the second side wall, and
   wherein the toilet cubicle is configured to be connected directly to an aisle region by the second access door.

3. The cabin module according to claim 2, wherein the second and the third side wall are connected at right angles by a connection region, and
   wherein the cabin module has a connecting door adjoining the connection region and configured to separate from an aisle region a secondary access region situated in front of the second access door, outside the toilet cubicle.

4. The cabin module according to claim 3, wherein at least one out of the first access door and the connecting door is constructed with a flight attendant seat configured to be used temporarily during flight.

5. The cabin module according to claim 1, wherein the frame structure further comprises third and fourth vertical structural elements, the first, second, third and fourth vertical structural element configured to be connected to a supporting structure and forming the first frame side, a second frame side, a third frame side and a fourth frame side, between which a spatial zone which adjoins the toilet cubicle and is separated from the toilet cubical by the third side wall is formed, and
   wherein the third side wall is formed in a second frame region.

6. The cabin module according to claim 1, wherein a cockpit door is configured to be secured in the third frame side arranged opposite the first frame region, and
   wherein the fourth frame side is arranged opposite the second frame side and on which a partition wall relative to a galley is configured to be secured.

7. A cabin module for an aircraft, the cabin module comprising a sanitary unit,
   wherein the sanitary unit comprises a toilet cubicle with a toilet,
   wherein the toilet cubicle is formed by four side walls and the toilet is arranged on a first side wall,
   wherein a first access door is arranged in a second side wall extending transversely to the first side wall and adjoining the first side wall,
   wherein the toilet cubicle further comprises a surface configured to at least partially accommodate a wheelchair,
   wherein the cabin module is configured to be installed with the second side wall transversely to the direction of flight,
   wherein the first side wall is aligned with an external wall in the installed state,
   wherein a second access door is arranged in a third side wall extending transversely to the second side wall and adjoining the second side wall,
   wherein the toilet cubicle is configured to be connected directly to an aisle region by the second access door,
   wherein the second and the third side wall are connected at right angles by a connection region,
   wherein the cabin module has a connecting door adjoining the connection region and configured to separate from an aisle region a secondary access region situated in front of the second access door, outside the toilet cubicle, and
   wherein the first access door and the connecting door are configured to be locked from the cockpit when the toilet cubicle and the access region are unused, and the toilet cubicle is accessible from the cockpit via the access region and the second access door.

8. An aircraft comprising:
a fuselage region; and a cabin interior arranged within the fuselage region,
wherein the cabin interior comprises a cabin module according to claim 1, and
wherein the aircraft has a longitudinal axis aligned with the direction of flight, and the second side wall of the toilet cubicle extends transversely to the longitudinal axis of the aircraft.

9. The aircraft according to claim 8, wherein the aircraft comprises a first fuselage door arranged in the forward region between a cockpit and a region containing passenger seats and forms an entry and exit for the cabin interior, and
wherein the sanitary unit is arranged next to the entry and exit.

10. The aircraft according to claim 9, wherein an entry/exit region is provided on the inside of the first fuselage door, and wherein the first access door opens into the entry/exit region.

11. The aircraft according to claim 8, wherein the cabin interior comprises an arrangement of passenger seats in which the passenger seats are arranged on both sides of a central aisle,
wherein a flight attendant seat, the seat position of which is aligned counter to the direction of flight, is integrated into the connecting door, and
wherein the flight attendant seat is arranged in alignment with the central aisle, thus enabling a person sitting on the flight attendant seat to see down the central aisle.

12. The aircraft according to claim 8, further comprising a floor hatch arranged in a floor region of a secondary access region in order to make available temporary access to a descent into a rest compartment situated below.

13. A method for creating a cabin module for an aircraft, wherein the method comprises:
   a) providing a sanitary unit with a toilet cubicle comprising a toilet; wherein the toilet cubicle is formed by four side walls;
   b) arranging the toilet on a first side wall; and
   c) arranging a first access door in a second side wall extending transversely to the first side wall and adjoining the first side wall,
wherein the toilet cubical comprises a surface configured to at least partially accommodate a wheelchair,
wherein the cabin module is configured to be installed with the second side wall transversely to a direction of flight;
wherein the first side wall is aligned with an external wall in the installed state,
the cabin module comprising a frame structure adjoining the toilet cubicle on a side opposite the first side wall,
wherein the frame structure is connected to a primary structure of a fuselage structure,
wherein the frame structure has at least two vertical structural elements forming a first frame side adjoining the second side wall and in which the connecting door is provided, and
wherein at least the first access door and the connecting door are secured on the frame structure.

\* \* \* \* \*